United States Patent
Kappelman et al.

(10) Patent No.: US 9,426,942 B2
(45) Date of Patent: Aug. 30, 2016

(54) HYBRID CROP STRIPPER BAND FOR A CROP PICK-UP

(71) Applicant: Deere & Company, Moline, IL (US)

(72) Inventors: Jacob D Kappelman, Bloomfield, IA (US); Jordan R Rappenecker, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 60 days.

(21) Appl. No.: 14/309,941

(22) Filed: Jun. 20, 2014

(65) Prior Publication Data

US 2015/0366138 A1    Dec. 24, 2015

(51) Int. Cl.
*A01D 89/00* (2006.01)

(52) U.S. Cl.
CPC ................... *A01D 89/002* (2013.01)

(58) Field of Classification Search
CPC ............... A01D 89/00–89/008; A01D 41/10; A01D 43/02; A01D 61/008
See application file for complete search history.

(56) References Cited

U.S. PATENT DOCUMENTS

| | | | | |
|---|---|---|---|---|
| 3,226,921 A * | 1/1966 | Shepley | ................. | A01D 57/02 53/341 |
| 3,613,345 A * | 10/1971 | Cofer | ...................... | A01F 15/08 56/364 |
| 3,713,283 A * | 1/1973 | Fritz | ...................... | H01Q 21/24 56/364 |
| 4,547,655 A * | 10/1985 | Kurata | .................. | B62D 1/065 219/204 |
| 5,052,171 A * | 10/1991 | Bich | .................... | A01D 89/002 56/364 |
| 6,244,779 B1 * | 6/2001 | Slasinski | ................. | F16C 11/10 403/110 |
| 6,314,708 B1 | 11/2001 | Engel | | |
| 6,314,709 B1 * | 11/2001 | McClure | .............. | A01D 89/002 56/132 |
| 6,370,856 B1 * | 4/2002 | Engel | .................... | A01F 15/106 198/676 |
| 7,478,523 B2 * | 1/2009 | McClure | .............. | A01D 89/002 56/364 |
| 8,181,435 B1 * | 5/2012 | McClure | .............. | A01D 89/002 56/364 |
| 8,876,624 B2 * | 11/2014 | Ban | ........................ | A63B 53/06 473/288 |
| 8,893,463 B2 * | 11/2014 | Pourchet | .............. | A01D 89/002 56/364 |
| 2002/0145881 A1 * | 10/2002 | Yamada | ............... | B60Q 1/0491 362/507 |
| 2003/0110752 A1 * | 6/2003 | Dow | ...................... | A01D 89/00 56/364 |
| 2004/0155020 A1 * | 8/2004 | Worrell | .................... | H05B 3/48 219/204 |
| 2005/0050981 A1 * | 3/2005 | Warhover | ................ | B62D 1/06 74/552 |
| 2007/0107402 A1 * | 5/2007 | McClure | .............. | A01D 89/002 56/14.4 |

(Continued)

FOREIGN PATENT DOCUMENTS

| | | | | |
|---|---|---|---|---|
| DE | 3315033 | * | 10/1984 | .......... A01D 89/002 |
| EP | 1097629 A1 | | 5/2001 | |
| EP | 2721919 A1 | | 4/2014 | |

OTHER PUBLICATIONS

Brando.com, Aug. 20, 2010, http://usb.brando.com/prod_detail.php?prod_id=00107.*

(Continued)

*Primary Examiner* — Alicia Torres
*Assistant Examiner* — Adam Behrens (57) ABSTRACT

A stripper band for a crop pick-up includes a U-shaped plastic body having an upper leg and upper bight portion reinforced by a sheet metal strap so as to stiffen the band for being able to withstand downward forces applied by heavy windrows of crop being picked up and conveyed over a top surface of the band. The sheet metal strap has upstanding bosses located about upper rear mounting holes against which clamping forces are directed when securing the band to the pick-up frame. Front and lower regions of the band are constructed only of plastic and remain flexible enough to absorb impacts from hard objects without permanent deformation of the band.

16 Claims, 6 Drawing Sheets

(56) References Cited

U.S. PATENT DOCUMENTS

2009/0025358 A1* 1/2009 Woodford ............ A01D 89/002 56/364
2009/0320434 A1* 12/2009 Pourchet .............. A01D 89/002 56/364
2011/0250822 A1* 10/2011 Koehl .................... A63H 18/02 446/444

OTHER PUBLICATIONS

EP Search Report issued in counterpart application No. 15171678.4 dated Oct. 28, 2015 (4 pages).

* cited by examiner

HYBRID CROP STRIPPER BAND FOR A CROP PICK-UP

FIELD OF THE INVENTION

The present invention relates to crop pick-ups, and more specifically relates to crop stripper bands for stripping the crop from the teeth of a tined pick-up rotor.

BACKGROUND OF THE INVENTION

Manufactures of crop pick-ups used in the hay and forage industry have mainly used metal, usually steel, stripper bands to protect internal components, such as tooth bars, of the crop pick-up. In operation, the pick-up will sometimes impact a dense object, such as a rock for example, causing the steel band involved in the impact to become permanently deformed. Typically, the impact will occur on a lower surface of a given stripper band which results in the band being deformed in the upward direction, and, in some cases, deformed left or right depending on the location of the area of the band impacted by the dense object. Once deformed, the steel band can cause internal damage to pick-up components such as the pick-up teeth or the tooth bar as these components collide with the deformed steel band. Furthermore, these collisions create noise, undue wear to the steel band and pick-up components, and create sharp edge locations along the steel band. These sharp edge locations make service difficult since they can cut the hands of a person doing the service work. Another source of service difficulty resides in the fact that hardware must be loosened or removed from on top and underneath the pick-up in order to replace a damaged steel band or damaged components beneath the band.

In order to overcome the above-noted drawbacks associated with steel stripper bands, some manufactures in recent years have replaced the steel crop stripper bands entirely with plastic crop stripper bands. Examples of such plastic stripper bands are disclosed in US Patent Application Pub. No.: US 2003/0110752 published Jun. 19, 2003 and US Patent Application Pub. No.: US 2009/0025358 published Jan. 29, 2009. Crop stripper bands made entirely of plastic offer good impact resistance (bounce back) when coming into contact with dense objects as compared to steel and, if adjacent parts (teeth) or internal parts (tooth bars) contact a plastic crop stripper band, wear and noise is greatly reduced as compared to contact with a steel crop stripper band. Plastic crop stripper bands will also not develop the sharp edges that are common with steel bands when contacted by internal and adjacent parts. Furthermore, when it comes time to replace internal components of the pick-up, the fasteners holding a given stripper band to the pick-up support frame need only be removed from the upper leg since the plastic stripper band can be easily deflected out of the way while leaving the bottom fasteners intact.

While making the stripper bands entirely out of plastic greatly improves impact resistance, wear, noise generation, serviceability and quality, a stripper band made entirely of plastic lacks the load carrying capacity of steel which is required for picking up very dense windrows. An entirely plastic crop stripper has seen success in the crop merger industry because the crop being picked up is much less dense as it has not been previously gathered. Another drawback associated with plastic crop stripper bands is that thermal and ultraviolet fluctuations cause the stripper bands to warp, which not only results in the pick-up being aesthetically displeasing but also results in crop entanglement due to crop entering gaps created by the warped bands. In addition, conventional fasteners are still required to secure the plastic bands in place with it being challenging to achieve proper bolt torque without crushing plastic located in the clamp joint.

Although it is known to apply a thin strip of plastic to a metal stripper band (see the aforementioned US Patent Application Publication No.: US 2009/0025358), these plastic clad metal bands are still prone to being permanently deformed when impacted with a hard object.

Accordingly, the problem to be solved is to provide crop stripper bands having the desirable characteristics of the above-described plastic bands while avoiding the drawbacks.

SUMMARY OF THE INVENTION

According to the present invention, it is an object to provide an improved crop stripper band for use with a crop pick-up that avoids the aforementioned drawbacks of the prior art stripper bands.

This object is achieved in one embodiment of the invention by providing a hybrid crop stripper band having a U-shaped main body made entirely of plastic, with an upper leg of the stripper band being reinforced with a metal strap located beneath and connected to the upper leg of the main body. A further feature of this embodiment is the provision of raised bosses on the metal strap in the vicinity of aligned mounting holes provided in a rear region of the upper leg of the main body and in a rear region of the metal strap, with the bosses projecting into the openings provided in the main body. Still a further feature of this embodiment is to provide a hole in a forward end region of the strap which receives a downwardly projecting protrusion of the main body to help lock the strap in place.

The aforementioned object is achieved in a second embodiment of the invention by providing a hybrid crop stripper band having a main body made entirely of plastic, with an upper leg of the stripper band being reinforced with a metal strap molded together with a U-shaped main plastic body so that the metal strap is secured within a recess provided in an upper leg of the main plastic body.

This and other objects of the invention will be apparent to one reading this specification together with the appended drawings.

DESCRIPTION OF THE PREFERRED EMBODIMENT

Figure 1:
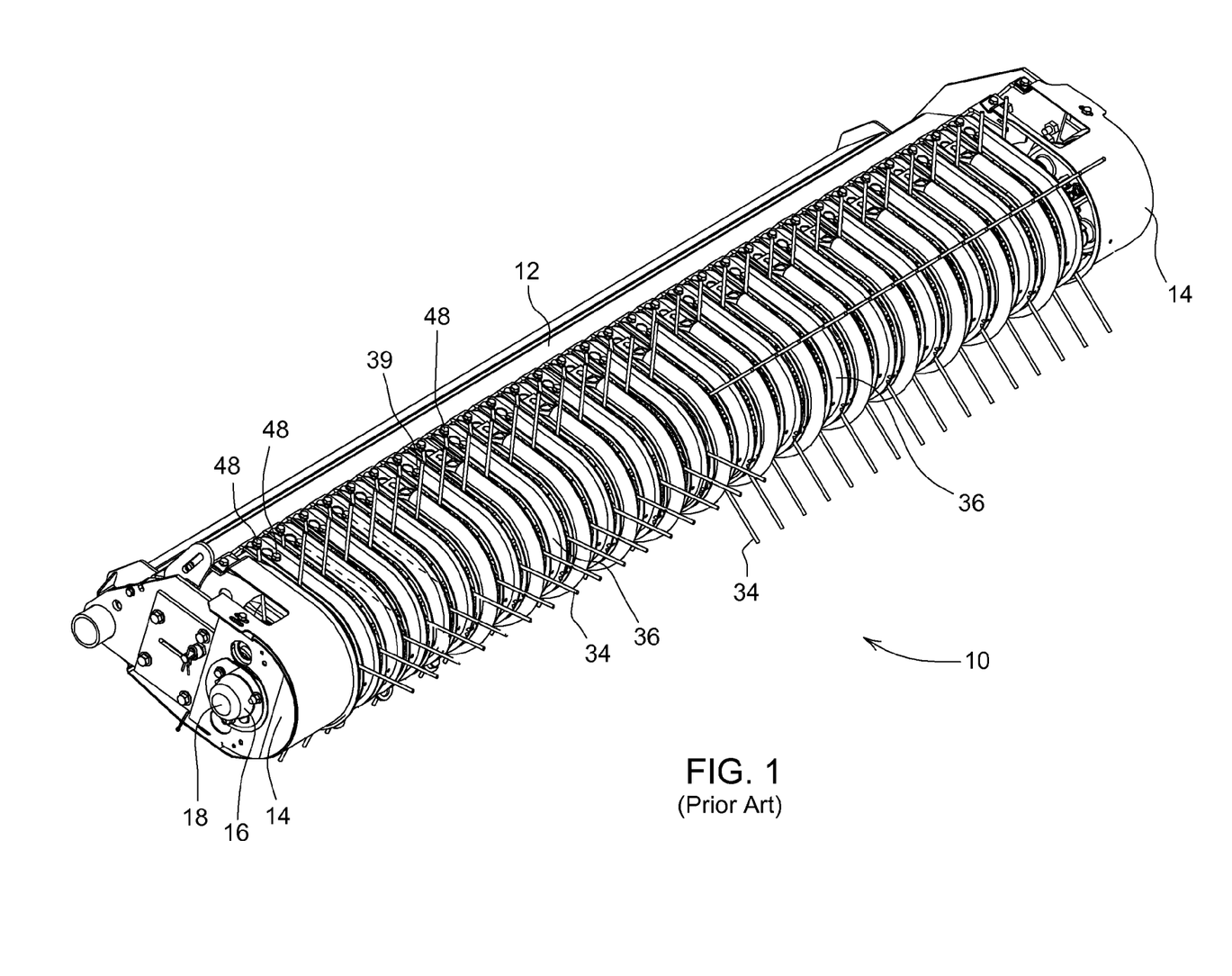
FIG. 1 is a right front perspective view of a prior art crop pick-up of the type with which the present invention is particularly adapted for use.
Figure 2:
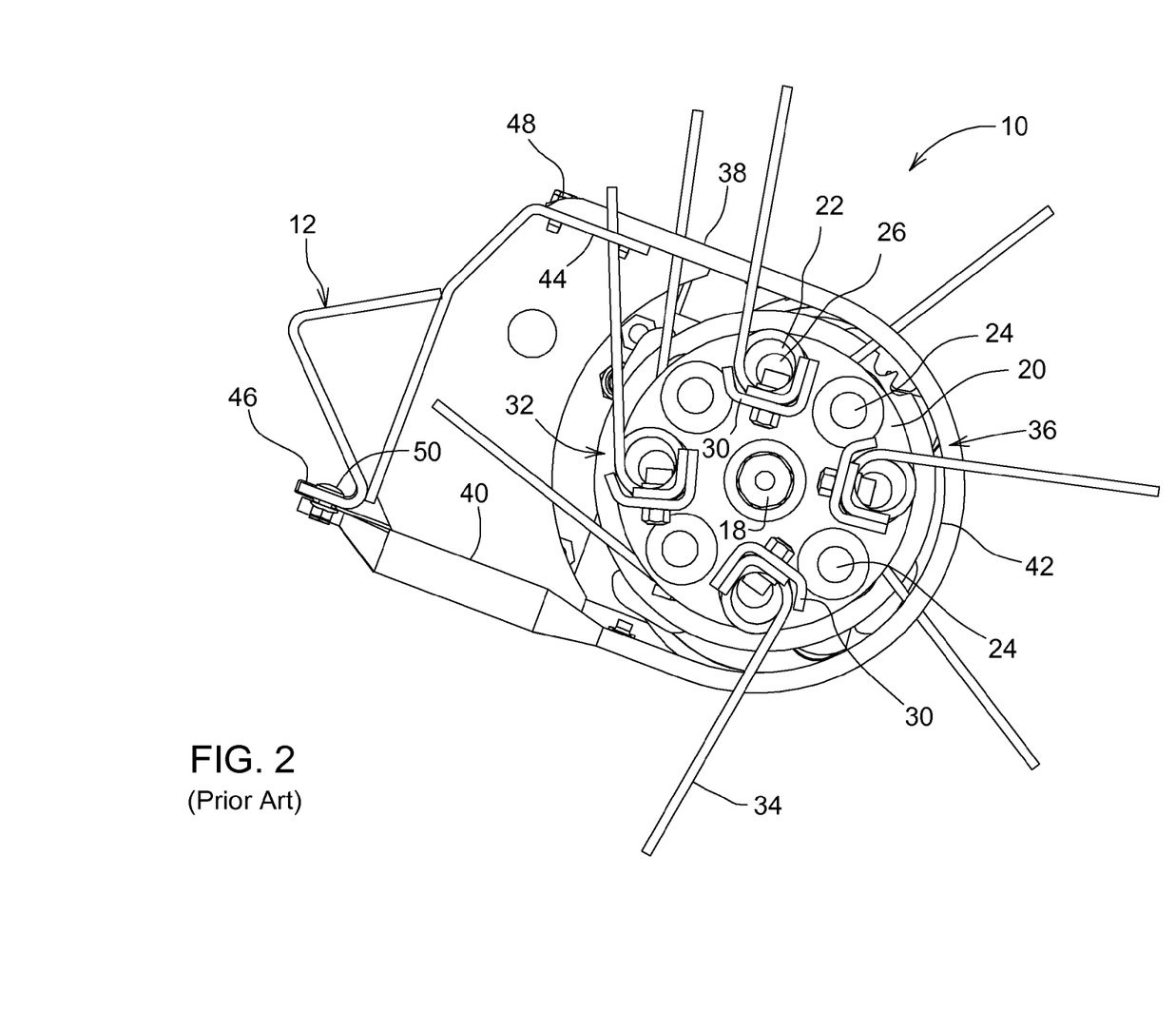
FIG. 2 is a left side view of the crop pick-up of FIG. 1, but with right end parts removed for clarity.

Referring now to FIGS. 1 and 2, there is shown a prior art crop pick-up 10 of a type with which the present invention is adapted for use. The crop pick-up 10 comprises a frame 12 including opposite side members 14 containing bearing assemblies 16 supporting opposite ends of a reel center shaft 18 having a tooth-bar support disc 20 mounted to a location half-way between opposite ends of the shaft. Located on opposite sides of the disc 20 are eight cylindrical tooth-bar receptacles 22, with the receptacles on the opposite sides of the disc 20 being aligned with each other and with through-bores in the disc 20. Alternate receptacles 22 on the left-hand side of the disc 20 receive a left-hand set of four tooth bars 24, while alternate receptacles 22 on the right-hand side of the disc receive a right-hand set of four tooth bars 26. The opposite ends of the tooth bars 26 are supported, in a known manner, by a cam support arrangement (not shown). Extending along, and fixed to, each tooth bar 24 and 26 is an angle member 30. A plurality of pick-up tine arrangements 32 are spaced along each angle member 30, with each tine arrangement including a pair of tines 34 respectively joined to opposite ends of a central coil spring section, as is known in the art. The tines 34 are mounted in co-planar arrangements on the four angle members 30 so that two sets of four co-planar tines 34 result for each coplanar set of four tine arrangements 32.

The pick-up 10 further includes a plurality of U-shaped crop stripper bands 36 disposed between adjacent sets of co-planar tines 34, with each stripper band being constructed entirely of sheet metal, sheet steel, for example. Each stripper band 36 includes fore-and-aft extending, upper and lower legs 38 and 40, respectively, having forward ends joined by an arcuate front bight 42. A rear end section of each upper leg 38 is engaged with a flat top mounting surface defined by one of a plurality of transversely spaced and forwardly extending mounting tabs 44 of the frame 12. A rear end section of each lower leg 40 is engaged with a flat bottom mounting surface defined by a back-turned plate portion 46 of the frame 12. Located centrally in a rear end of each upper leg 38 is a notch receiving a first headed fastener 48 screwed into the plate portion 44 of the frame. Located in each upper leg 38 just forwardly of the notch is a keyhole-shaped opening having a second headed fastener 48 located in a narrow portion of the opening and screwed into the frame plate portion 44, with a large portion of the opening being sized to permit passage of the fastener head for removal of a selected stripper band after loosening the fasteners 48 and sliding the stripper band forwardly to align the large portion of the opening with the fastener head. Located centrally in a rear end of the lower leg 40 of each stripper band is a mounting slot in which is received a fastener here shown as a mounting bolt 50 inserted downwardly through the frame portion 46 and having a nut screwed onto its lower end and tightened against the stripper band.

Figure 3:
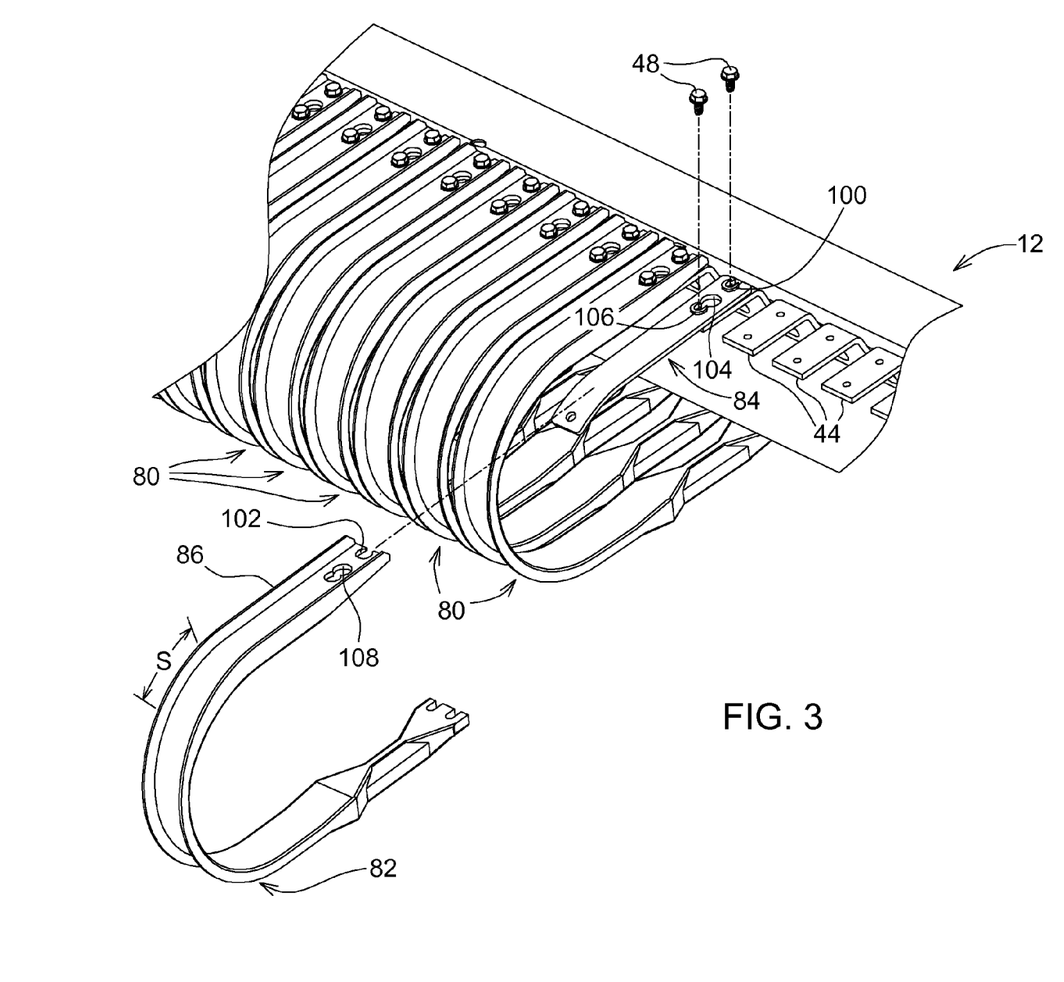
FIG. 3 is a top left perspective view of a portion of a crop pick-up showing a plurality of hybrid crop stripper bands of the present invention mounted to the pick-up frame, with an exploded view of one crop stripper band being shown wherein a metal strap is separated from its mounting location in an upper leg of a U-shaped, main plastic body.
Figure 4:
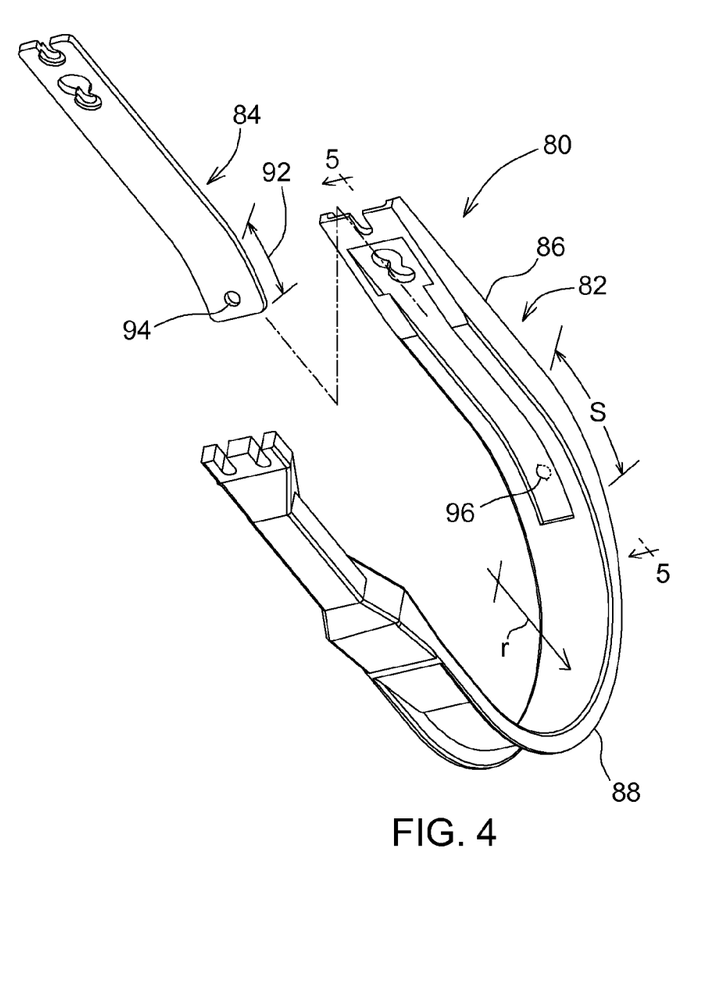
FIG. 4 is an exploded, right bottom perspective view of the hybrid crop stripper band shown in FIG. 3.
Figure 5:
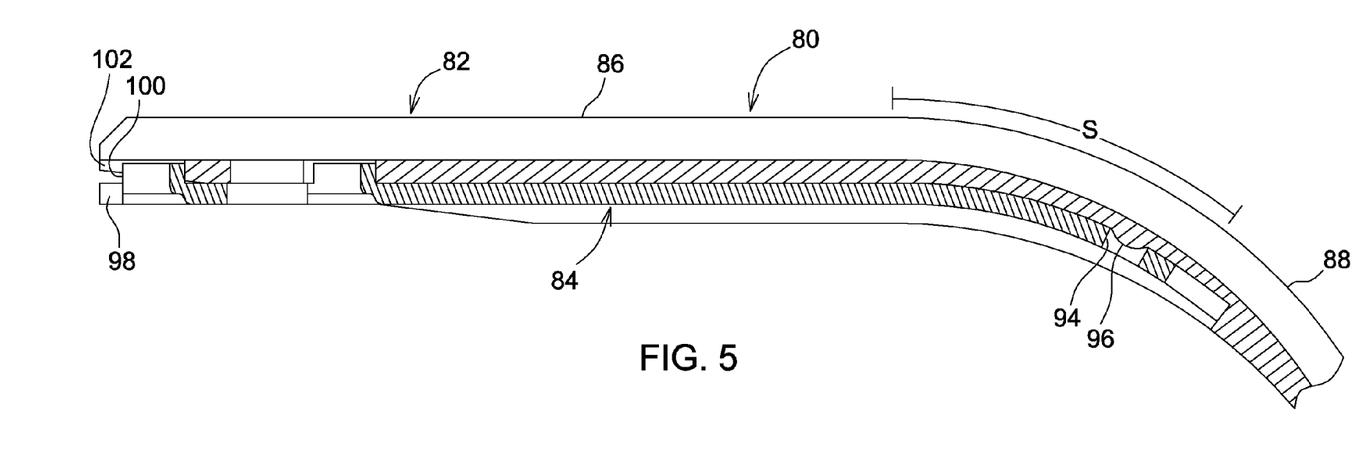
FIG. 5 is a sectional view taken along line 5-5 of FIG. 4, but showing the metal strap mounted to the plastic main body of the stripper band.
Figure 6:
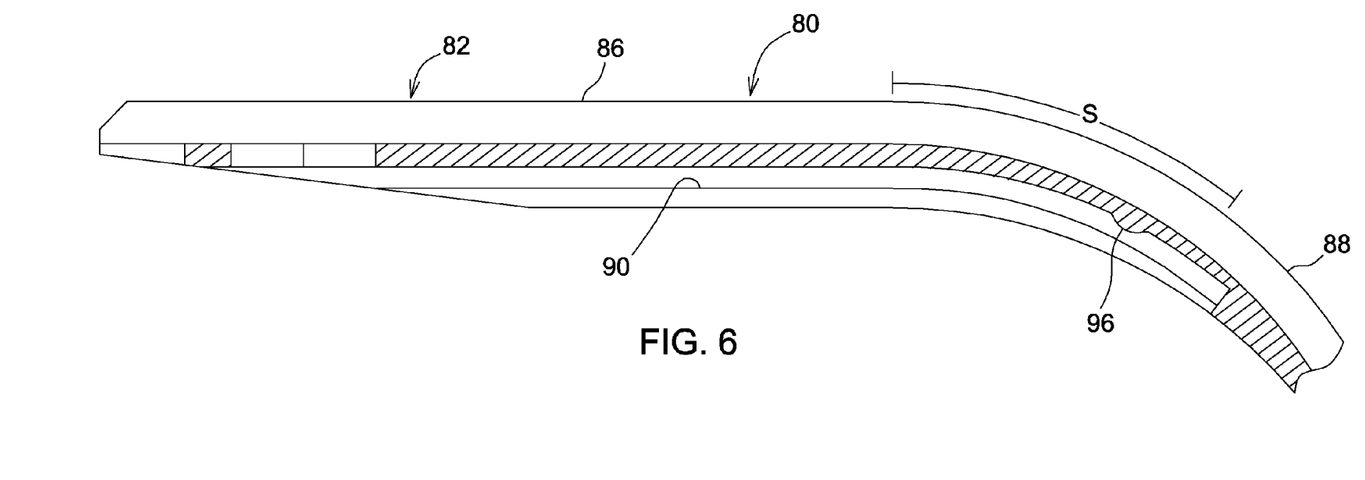
FIG. 6 is like FIG. 5, but showing the metal strap removed from the main body of the stripper band.

Referring now to FIG. 3, there is shown a plurality of hybrid crop stripper bands 80 constructed in accordance with the present invention and dimensioned for replacing the crop stripper bands 36 of the above-described prior art pick-up 10, with it to be understood that the principles of the present invention can be embodied in crop stripper bands having other dimensions. Referring now also to FIGS. 4-6, it can be seen that the hybrid stripper bands 80 each include a U-shaped main body 82 made of plastic material and a metal strap 84 positioned beneath and having a length overlapping an entire upper leg 86 of the main body 82 and a relatively short upper portion or region S of a forward arcuate bight or nose 88 of the main body, thereby reinforcing the upper leg 86 and region S of the plastic main body 82.

In this particular embodiment of the invention, the upper leg 86 of the plastic main body 82 is generally H-shaped in cross section, with the portions of the legs of the H below the bar of the H having a relatively wide dimension and respectively being provided with opposed horizontal grooves 90 (see FIG. 6) thereby forming a slot just below the bar of the H for reception of the metal strap 84. Specifically, the metal strap 84 has a width dimension slightly less than the distance between the bottoms of the opposed grooves 90 and has opposite side portions respectively received in the opposed grooves. A front section 92 of the strap 84 is curved complementary to the curvature of the relatively short upper bight portion S of the bight 88 of the main body 82 and contains a hole 94 in which is received a domed protrusion 96 formed on the short bight portion S of the main body 82. A rear end of the strap 84 is provided with an opening in the form of a U-shaped notch 98 which extends through a raised boss 100 formed on an upper surface of the strap 84, the notch 98 being aligned with a similarly shaped notch 102 provided in a rear end of the upper leg 86 of the associated stripper band main body 82. Spaced forward in the strap 84 from the notch 98 is a keyhole-shaped opening 104 oriented with its small end forward and extending through a raised boss 106 provided on a top surface of the strap 84. A similar keyhole-shaped opening 108 is provided in the associated stripper main body 82 in vertical alignment with the opening 104, with the raised boss 106 of the metal strap 84 being received in the small end of the keyhole-shaped opening 108, noting that the depth of the notch 102 and keyhole-shaped opening 108 are slightly more than the height of the bosses 100 and 106. The upper legs 86 of the hybrid stripper bands 80 are each mounted to a respective one of the mounting tabs 44 of a the frame 12 by the mounting fasteners 48 which are respectively inserted through the openings in the metal strap bosses 100 and 106 and screwed into the aligned one of the pair of threaded holes provided in the associated mounting tab 44, flanged heads of the fasteners 48 exerting a clamping force which acts through the bosses 100 and 106 which assist in forming a strong clamping joint between the hybrid stripper band 80 and the pick-up frame tab 44.

Thus, as constructed, the upper leg 86 and small upper bight portion or region S of the hybrid stripper band 80 which is reinforced by the metal strap 84 is relatively rigid (substantially equivalent to that of prior art steel stripper bands), with rigidity decreasing as one moves clockwise around the nose 88, as viewed in FIG. 4, noting that the region of the nose from about seven o'clock to about nine o'clock can be considered very flexible (substantially equivalent to that of prior art plastic stripper bands).

Because the metal straps 84 are located beneath the upper legs 86 of the plastic main stripper bodies 82, noise transmission between the metal straps 84 and other metal components is reduced. Another advantage is that the metal straps rigidify the plastic upper legs 86 so as to minimize the amount of warping that would otherwise occur due to them being located where they are exposed to sunlight and vulnerable to the effects of ultra violet light and warping due to thermal instability.

The operation of the hybrid stripper band 80 is thought evident from the forgoing description but is briefly iterated here. Assuming that a pick-up 10 is equipped with hybrid crop stripper bands 80 and, during operation in picking up a windrow of crop, encounters a relatively large obstruction, such as a rock, the impact area of the stripper band or bands 80 which come into contact with the rock (likely the lower front of the nose 88) will initially be deflected upward and possibly deformed to the extent that comes into contact with the pick-up teeth and/or tooth bars or other internal components. Since this impact area of the stripper band consists of plastic, any contact with the pick-up teeth and/or internal components will generate very little noise or wear. Once the pick-up travels past the obstruction, the deformed area of the stripper band or bands 80 will, because of being made of plastic, rebound and return to their normal shape.

In the event that the pick-up 10 is operating to pick up relatively heavy or dense windrows, the metal strap 84 located in the upper legs 86 of the main stripper bodies 82 will afford the same strength in this area as do the upper legs of known steel crop stripper bands, this strength being sufficient to withstand the weight of dense windrows. Therefore, the hybrid crop stripper bands 80 are not deflected or deformed in any appreciable amount that results in the stripper bands 80 coming into contact with the pick-up teeth or internal components.

It is noted that replacement of a broken or damaged component located within the bounds of the stripper bands 80 is not hindered by the presence of the rigid metal strap 84 due to the quick-release attachment of the upper legs of the bands to the pick-up frame. Specifically, all that is required is that the fasteners 48 associated with the stripper band or bands 80 blocking access to the component to be repaired or replaced be loosened sufficiently for the associated upper leg 86 to be pulled forwardly and removed from the loosened fasteners, and then deflected to the side, as is permitted by the flexibility of the plastic main body 82. In contrast, if steel stripper bands were used, the entire stripper would be rigid and such deflection would not be possible.

Figure 7:
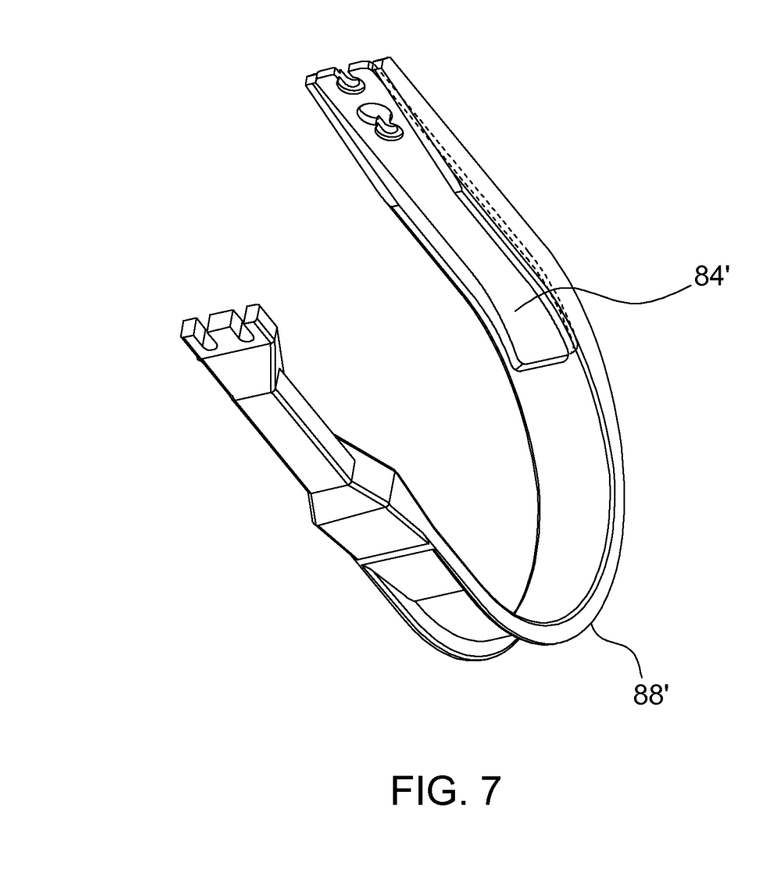
FIG. 7 is a right bottom perspective view of a second embodiment of the hybrid crop stripper band wherein the metal strap is molded into an upper leg of a plastic main body of the crop stripper band.

Referring now to FIG. 7, there is shown a second embodiment of the invention comprising a hybrid crop stripper band 80', which is substantially similar to the stripper band 80, but differs in that it includes a U-shaped main stripper body 82' having an upper leg 86' having a recess in which a metal strap 84' has been secured during the process of molding the plastic main stripper body 82'. In this embodiment, the strap 84' includes bosses like the bosses 102 and 106 of the previously described strap 84, but does not include a hole in its forward end region. The operation of this embodiment is essentially the same as that of the first embodiment.

In addition to the stripper band embodiments described above, it would be possible to join the metal strap to the plastic main body by using just the fasteners 48, or by using any combination of the aforementioned ways of securing the metal strap to the plastic main body.

Having described the preferred embodiment, it will become apparent that various modifications can be made without departing from the scope of the invention as defined in the accompanying claims.

The invention claimed is:

1. A crop stripper band for use on a crop pick-up, the crop stripper band comprising:
   fore-and-aft extending upper and lower legs having forward ends joined to an arcuate bight section;
   said upper leg being constructed of plastic and provided with a slot on the inner side having a metal reinforcement positioned within the slot beneath the upper leg so as to afford strength for supporting a load of crop; and
   said lower leg being constructed entirely of plastic and being resilient so as to rebound to its original shape after being deflected by contacting an obstruction;
   wherein at least a rear end of the upper leg is provided with a release attachment to be used in releasably securing the stripper band to a pick-up frame member, the release attachment includes slots provided in a rear end of the upper leg of the stripper band for engaging releasable fasteners provided on the pick-up frame.

2. The crop stripper band, as defined in claim 1, wherein said metal reinforcement is defined by a metal strap extending a full length dimension of said upper leg.

3. The crop stripper band, as defined in claim 1, wherein said metal strap extends into an upper region of said arcuate bight section.

4. The crop stripper band, as defined in claim 1, wherein an upper region of said bight section is constructed of plastic together with said metal reinforcement.

5. The crop stripper band, as defined in claim 4, wherein said metal reinforcement is defined by a metal strap extending a full length dimension of said upper leg and continues into the upper region of said arcuate bight section.

6. The crop stripper band, as defined in claim 5, wherein that portion of the metal strap which continues into the upper region of said arcuate bight section contains at least one hole between its opposite ends; and said plastic of the upper region of the bight section being provided with a protuberance received in said at least one hole to aid in retaining the metal strap in said slot.

7. The crop stripper band, as defined in claim 1, wherein the metal reinforcement is joined to the plastic of the upper leg by being molded into the plastic.

8. The crop stripper band, as defined in claim 2, wherein said upper leg includes a plastic stripper band body extending at least a full length dimension of said upper leg and containing at least one vertical mounting hole in a rear region of said upper leg; and said metal strap including a first raised boss received in said at least one mounting hole provided in the rear region of the upper leg of the plastic stripper band body, with at least a first mounting hole of the metal strap extending through said first raised boss.

9. The crop stripper band, as defined in claim 8, wherein said first raised boss has a height less than a thickness dimension of said plastic stripper body at a location containing said at least one vertical mounting hole.

10. A crop stripper band for use on a crop pick-up, the crop stripper band comprising:
    fore-and-aft extending upper and lower legs having forward ends joined to an arcuate bight section;
    said upper leg being constructed of plastic and provided with a slot on the inner side having a metal reinforcement positioned within the slot beneath the upper leg so as to afford strength for supporting a load of crop; and
    said lower leg being constructed entirely of plastic and being resilient so as to rebound to its original shape after being deflected by contacting an obstruction;
    said metal reinforcement is defined by a metal strap extending a full length dimension of said upper leg which includes a plastic stripper band body extending at least a full length dimension of said upper leg and containing at least one vertical mounting hole in a rear region of said upper leg; and said metal strap including a first raised boss received in said at least one mounting hole provided in the rear region of the upper leg of the plastic stripper band body, with at least a first mounting hole of the metal strap extending through said first raised boss; and said at least one mounting hole provided in the rear region of the upper leg of the plastic stripper band body is a rearward opening, U-shaped notch provided in a rear end of the stripper band body; another mounting hole being provided in the upper leg of the stripper band body at a location spaced forwardly of, and in fore-and-aft alignment with, said U-shaped notch; and said at least first mounting hole of the metal strap being a U-shaped notch; and said metal strap including a second mounting hole shaped complementary to, and being aligned with said another mounting hole of the plastic stripper band body; and said metal strap having a second raised boss received in said another mounting hole of the plastic stripper body and said second mounting hole of said metal strap extending through said second raised boss.

11. A crop stripper band for use on a crop pick-up, the crop stripper band, comprising:

a plastic stripper band body which includes fore-and-aft extending, upper and lower legs, respectively, joined to an arcuate bight section, with at least one vertical mounting hole being located in rear regions of each of said upper and lower legs, the upper leg provided with a slot on the inner side having a metal reinforcement positioned within the slot beneath the upper leg; the metal reinforcement being located within said upper leg of said plastic stripper band body so as to afford strength for supporting a load of crop;

said lower leg being constructed entirely of plastic and being resilient so as to rebound to its original shape after being deflected by contacting an obstruction;

said metal reinforcement comprises a metal strap shaped complementary to, and extending at least an entire length dimension of, said upper leg of said plastic stripper band body, with a rear region of said metal strap containing at least a first mounting hole aligned with said at least one vertical mounting hole in the rear region of said upper leg of the plastic stripper band body; and a securing arrangement fixing the metal strap to said plastic stripper band body;

said upper leg of said plastic stripper band body has opposite upright sides joined to, and depending from, a transverse middle wall section, with said securing arrangement including opposed grooves respectively being provided in inner wall surfaces of said opposite upright sides adjacent a lower surface of said transverse middle section; and said metal strap being snugly received in said opposed grooves and engaging said lower surface of said transverse middle wall section;

said metal strap includes a first raised boss received in said at least one mounting hole provided in the rear region of the upper leg of the plastic stripper band body, with said at least a first mounting hole of the metal strap extending through said raised boss; and said at least one mounting hole provided in the rear region of the upper leg of the plastic stripper band body is a rearward opening, U-shaped notch provided in a rear end of the upper leg of the stripper band body; another mounting hole being provided in the upper leg of the stripper band body at a location spaced forwardly of, and in fore-and-aft alignment with, said U-shaped notch; and said at least first mounting hole of the metal strap being a U-shaped notch; and said metal strap including a second mounting hole shaped complementary to, and being aligned with said another mounting hole of the plastic stripper band body, with said metal strap having a second raised boss received in said another mounting hole of the plastic stripper body and with said second mounting hole of said metal strap extending through said second raised boss.

12. The crop stripper band, as defined in claim 11, wherein said metal strap has a length dimension extending forwardly beyond said upper leg of said plastic stripper band body with a forward end region of the metal strap being engaged with an upper region of said arcuate bight section of the plastic stripper band body.

13. The crop stripper band, as defined in claim 11, wherein said securing arrangement further includes a downwardly projecting protuberance located centrally on said upper region of said arcuate bight section of the plastic stripper band and an opening provided in said forward end region of said metal strap and receiving said protuberance.

14. The crop stripper band, as defined in claim 11, wherein said raised boss has a height less than a thickness dimension of said transverse middle section of the rear region of the upper leg of the plastic stripper body containing said at least one mounting hole.

15. The crop stripper band, as defined in claim 11, wherein said raised first and second bosses have a height which is less than a thickness dimension of said transverse middle section of the rear region of the upper leg of the plastic stripper body containing the at least one and another mounting holes.

16. The crop stripper band, as defined in claim 11, wherein the securement arrangement comprises said metal strap being molded into said upper leg of the plastic stripper band body.

* * * * *